US012352709B2

(12) United States Patent
An et al.

(10) Patent No.: US 12,352,709 B2
(45) Date of Patent: Jul. 8, 2025

(54) FLEXIBLE DIGITAL DETECTOR ARRAY

(71) Applicant: Baker Hughes Holdings LLC, Houston, TX (US)

(72) Inventors: Kwang Hyup An, Fulshear, TX (US); Steven Wissels, Berchem (BE)

(73) Assignee: Baker Hughes Holdings LLC, Houston, TX (US)

(*) Notice: Subject to any disclaimer, the term of this patent is extended or adjusted under 35 U.S.C. 154(b) by 265 days.

(21) Appl. No.: 18/098,353

(22) Filed: Jan. 18, 2023

(65) Prior Publication Data

US 2023/0280288 A1 Sep. 7, 2023

Related U.S. Application Data

(60) Provisional application No. 63/315,122, filed on Mar. 1, 2022.

(51) Int. Cl.
G01N 23/18 (2018.01)
G01N 23/083 (2018.01)
H04N 25/30 (2023.01)

(52) U.S. Cl.
CPC ........... G01N 23/18 (2013.01); G01N 23/083 (2013.01); H04N 25/30 (2023.01); G01N 2223/501 (2013.01); G01N 2223/628 (2013.01)

(58) Field of Classification Search
None
See application file for complete search history.

(56) References Cited

U.S. PATENT DOCUMENTS

2015/0060682 A1* 3/2015 Weisfield ............ H10F 39/813
 250/208.1
2016/0070006 A1* 3/2016 Konkle ................ H04N 23/30
 250/366
2021/0389480 A1* 12/2021 Nomura ............. G01T 1/20182

* cited by examiner

Primary Examiner — Edwin C Gunberg
(74) Attorney, Agent, or Firm — Mintz, Levin, Cohn, Ferris, Glovsky and Popeo, P.C.

(57) ABSTRACT

A flexible digital detector array apparatus including a control system including a block control module, a gate control module, and at least one data module. The block control module and the gate control module can be arranged to execute a multiplexing operation. The apparatus can also include a flexible substrate coupled to the control system at an edge of the flexible substrate via a plurality of connectors. The flexible substrate can include a switching area including a plurality of switching pixels arranged within a plurality of blocks. Each switching pixel can be communicatively coupled to the block control module and the gate control module. The apparatus can also include a sensing area including an array of sensing pixels. The array of sensing pixels can generate image data responsive to X-rays incident thereon and provide the image data to the plurality of data modules. Each switching pixel of the plurality of switching pixels can be arranged to control a read state of a portion of sensing pixels.

20 Claims, 9 Drawing Sheets

FLEXIBLE DIGITAL DETECTOR ARRAY

RELATED APPLICATION

This application claims priority under 35 U.S.C. § 119(e) to U.S. Provisional Application No. 63/315,122 filed Mar. 1, 2022, the entire contents of which are hereby expressly incorporated by reference herein.

TECHNICAL FIELD

The subject matter described herein relates to a flexible X-ray sensor.

BACKGROUND

Sensors, such as X-ray sensors, can be used to detect defects in pipes configured in pipelines. The defects can be present in pipe materials or in welds joining portions of pipe. Sensors can also be used to measure properties or qualities of fluids flowing through pipes. X-ray sensors can include arrays of digital detector elements configured to sense the defects, properties of the pipe, or fluid properties within the pipe. It can be advantageous to form an X-ray sensor with a flexible mating surface which can substantially match a profile of an object being sensed by the sensor. In this way, a maximal surface area of the sensor is in contact with the object being sensed and the accuracy and sensitivity of the X-ray sensor can be increased compared to sensors with non-conformal mating surfaces.

SUMMARY

In one aspect, a flexible digital detector array apparatus is provided. In some embodiments, the apparatus can include a control system including a block control module including block control circuitry, a gate control module including gate control circuitry, and at least one data module including data circuitry. The block control module and the gate control module can be configured to execute a multiplexing operation. The apparatus can further include a flexible substrate that can be coupled to the control system at an edge of the flexible substrate via a plurality of connectors. The flexible substrate can further include a switching area including a plurality of switching pixels arranged within a plurality of blocks. Each switching pixel can be communicatively coupled to the block control module via the block control circuitry and to the gate control module via the gate control circuitry. The apparatus can further include a sensing area including an array of sensing pixels, the array of sensing pixels can be configured to generate image data responsive to X-rays incident thereon. The array of sensing pixels can be further configured to provide the image data to the plurality of data modules via the data circuitry. Each switching pixel of the plurality of switching pixels can be configured to control a read state of a portion of sensing pixels.

In another embodiment, the block control module can be configured to provide a first block control signal to a first block including a first plurality of switching pixels to power on the first block, and a second block control signal to the blocks other than the first block to power off the blocks other than the first block.

In another embodiment, the gate control module can be configured to provide a first gate control signal to a second plurality of switching pixels, and a second gate control signal to all switching pixels outside of the second plurality of switching pixels. Each switching pixel in the second plurality can be in a different block and the first gate control signal can cause a first switching pixel in the second plurality of switching pixels and in the first block to activate. This activation can cause a first portion of pixels of the sensing area to transition from a non-read state to a read state.

The apparatus of claim 3, wherein image data generated by the first portion of pixels associated with the first switching pixel is provided to the at least one data module via the data circuitry responsive to transitioning to the read state.

In another embodiment, the first block control signal and the first gate control signal can include a first predetermined voltage, and the second block control signal and the second gate control signal include a second predetermined voltage.

In another embodiment, the flexible substrate can include a coating enclosing the data module, gate module, and block control modules.

In another embodiment, each pixel of the at least one array of sensing pixels can include at least one photodiode, and at least one sensing thin-film transistor (TFT). Additionally, each switching pixel of the plurality of flexible switching pixels can include at least one gate TFT and at least one gate capacitor. Further, the block controller can include a first gate integrated circuit (GIC) and the gate controller can include a second gate integrated circuit (GIC). Further, the at least one data module can include at least one read-out integrated circuit (ROIC).

In another embodiment, each sensing pixel of the at least one array of sensing pixels can further include at least one sensing pixel capacitor. Additionally, the apparatus can further include a film laminated to the flexible substrate forming a scintillator.

In another embodiment, the film can include a gadolinium oxysulfide film or a cesium iodide film.

In another embodiment, the block control module and the gate control module can each include 32, 64, 128, 256, 512 or 1024 ports to connect to the plurality of blocks or the plurality of switching pixels, respectively.

In another embodiment, the sensing pixels of the sensing area can have a first dimension between 25 mm-250 mm and a second dimension between 100 mm-600 mm.

In another aspect, a method for using a flexible x-ray digital detector array is provided. In some embodiments, the method can include configuring a flexible x-ray digital detector array (DDA) with respect to an object to be inspected. In some embodiments, the flexible DDA can include a bus, and a control system including a block control module including block control circuitry, a gate control module including gate control circuitry, and at least one data modules including data circuitry. The block control module and the gate control module are configured to execute a multiplexing operation. The flexible DDA can also include a flexible substrate coupled to the control system at one edge of the flexible substrate via a plurality of connectors. The flexible substrate can include a switching area including a plurality of switching pixels arranged within a plurality of blocks, each switching pixel communicatively coupled to the block control module via the block control circuitry and to the gate control module via the gate control circuitry. The flexible DDA can further include a sensing area including an array of pixels, the array of pixels can be configured to generate image data responsive to X-rays incident thereon and provide the image data to the plurality of data modules via the data circuitry. Each switching pixel of the plurality of switching pixels controls a read state of a portion of sensing pixels. In this embodiment, the method can also include scanning the object using an X-ray emitting device.

The method can further include acquiring, by a computing system including at least one processor, image data characterizing the scanned object.

In another embodiment, the acquiring can further include providing a first block control signal to a first block including a first plurality of switching pixels and providing a second block control signal to the blocks other than the first block via the block circuitry. In this embodiment, the method can further include providing a first gate control signal to a second plurality of switching pixels and providing a second gate control signal to all switching pixels outside of the second plurality of switching pixels. Each switching pixel in the second plurality can be in a different block and the first gate control signal can cause a first switching pixel in the second plurality of switching pixels and in the first block to activate, causing a first portion of pixels of the sensing area to transition from a non-read state to a read state. In this embodiment, the method can also include receiving, by the at least one processor, image data characterizing the scanned object from the first portion of pixels from the at least one data module via a communication module coupled to the bus. In this embodiment, the method can also include providing a second block control signal to the first block via the block circuitry. This can cause the first switching pixel to deactivate, causing the first portion of pixels of the sensing area to transition from the read state to the non-read state.

In another embodiment, the acquiring can further include a step of providing the second gate control signal to the second plurality of switching pixels. The method can further include a step of providing a first block control signal to the first block and providing a second block control signal to the blocks other than the first block via the block circuitry. The method can also include providing a first gate control signal to a third plurality of switching pixels and providing a second gate control signal to all switching pixels outside of the third plurality of switching pixels. Each switching pixel in the third plurality can be in a different block and the first gate control signal can cause a second switching pixel in the third plurality of switching pixels and in the first block to activate, causing a second portion of pixels of the sensing area to transition from a non-read state to a read state. In this embodiment, the method can further include receiving, by the at least one processor, image data characterizing the scanned object from the second portion of pixels from the at least one data module via a communication module coupled to the bus. The method can further include providing a second block control signal to the first block via the block circuitry. This can cause the second switching pixel to deactivate causing the second portion of pixels of the sensing area to transition from the read state to the non-read state. The method can further include repeating the steps of acquiring for all of the switching pixels in the first block. In some embodiments, the method can further include repeating the steps of acquiring for all of the blocks in the plurality of blocks.

In another embodiment, the acquiring can further include a step of providing the second gate control signal to the second plurality of switching pixels. The method can further include a step of providing the first block control signal to a second block including a fourth plurality of switching pixels, and providing the second block control signal to the blocks other than the second block via the block circuitry. In this embodiment, the method can further include providing the first gate control signal to the third plurality of switching pixels and providing the second gate control signal to all switching pixels outside of the third plurality of switching pixels. Each switching pixel in the third plurality can be in a different block and the first gate control signal can cause the second switching pixel in the third plurality of switching pixels and in the second block to activate, causing a second portion of pixels of the sensing area to transition from a non-read state to a read state. The method can also include receiving, by the at least one processor, image data characterizing the scanned object from the second portion of pixels from the at least one data module via a communication module coupled to the bus; providing the second block control signal to the second block via the block circuitry. In this embodiment, this can cause the second switching pixel to deactivate causing the second portion of pixels of the sensing area to transition from the read state to the non-read state. The method can further include repeating the steps of acquiring starting by providing the first block control signal to the first block and the first gate control signal to a fifth plurality of switching pixels. Alternatively the method can further include repeating the steps of acquiring starting by providing the first block control signal to a third block and the first gate control signal to a fifth plurality of switching pixels.

In another embodiment, the first block control signal and the first gate control signal can include a first predetermined voltage, and the second block control signal and the second gate control signal include a second predetermined voltage.

In another aspect, a flexible x-ray digital detector array system is provided. In some embodiments, the system can include a bus. The system can further include a control system including a block control module including block control circuitry, a gate control module including gate control circuitry, and at least one data modules including data circuitry. The block control module and the gate control module are configured to execute a multiplexing operation. The system can also include a flexible substrate coupled to the control system at one edge of the flexible substrate via a plurality of connectors. The flexible substrate can include a switching area including a plurality of switching pixels arranged within respective blocks. Each switching pixel can be communicatively coupled to the block control module via the block control circuitry and to the gate control module via the gate control circuitry. The system can also include a sensing area including an array of sensing pixels, the array of sensing pixels configured to generate image data responsive to X-rays incident thereon and provide the image data to the plurality of data modules via the data circuitry. Each switching pixel of the plurality of switching pixels can be configured to control a read state of a portion of sensing pixels. The system can also include a plurality of connectors provided on the edge of the flexible substrate configured to communicatively connect the block control module, gate control module, and at least one data module to the bus. The system can further include a communication module coupled to the bus and configured carry out communication protocols within the system. The system can also include a battery module coupled to the bus and configured to provide power to the system. The system can further include a computing system, including at least one processor configured acquire image data characterizing the scanned object.

In another embodiment, the flexible substrate can be detachably coupled to the bus at the plurality of connectors for replacement.

In another embodiment, the communication module can be any one of a 5G or 6G communication module, a Wi-Fi module, and a wired Ethernet module.

In another embodiment, the system can further include a global positioning system (GPS) module configured to provide positioning data corresponding to a location of the system to an external system.

DESCRIPTION OF DRAWINGS

These and other features will be more readily understood from the following detailed description taken in conjunction with the accompanying drawings, in which.

Figure 1:
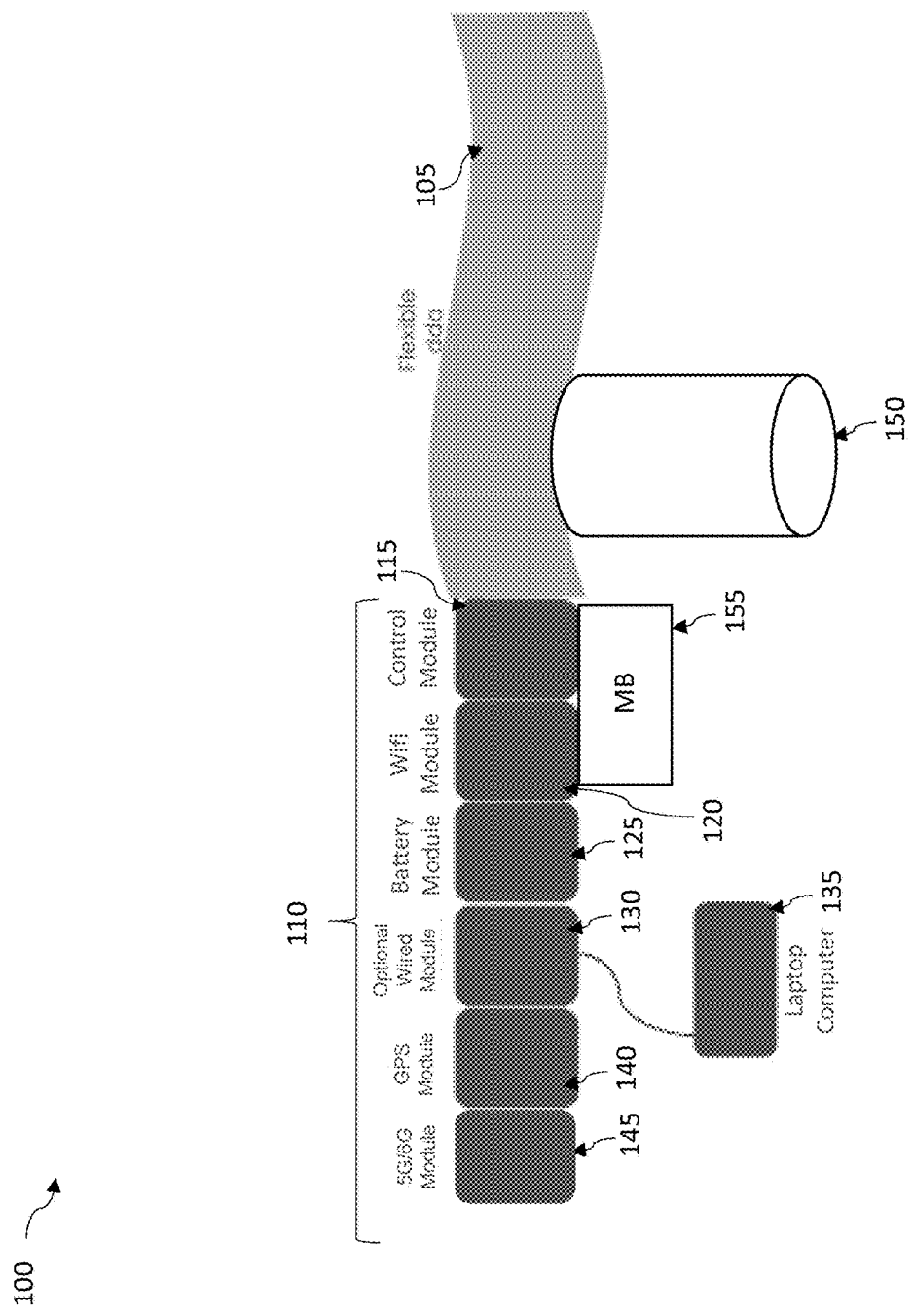
FIG. 1 is a diagram illustrating an embodiment of a flexible DDA according to the subject matter provided herein.

It is noted that the drawings are not necessarily to scale. The drawings are intended to depict only typical aspects of the subject matter disclosed herein, and therefore should not be considered as limiting the scope of the disclosure.

DETAILED DESCRIPTION

Existing digital X-ray sensors for use in detecting defects or monitoring fluids within pipes configured in industrial pipelines may include rigid mating or sensing surfaces which are unable to fully conform to a curved object, such as a pipe. Thus, the application of existing digital X-day sensors to a wide variety of object shaped is limited. In addition, traditional X-ray sensors include non-modular arrangements of electrical components as designed by the manufacturer which can limit customer configurability and application usage of the X-ray sensor. For example, traditional X-ray sensors require the electrical components, such as data modules or gate modules that include a rigid printed circuit boards (PCB), arranged around the periphery of the sensor pixel array such that the electrical connections are provided on all sides of the sensor pixel array.

A further limitation of existing X-ray sensors is their limited configurability and modularity. Typically X-ray sensors are manufactured with a predetermined number and/or configuration of processing or data modules that can be communicatively coupled to the X-ray control module. A users intended use may be limited to available modules or configurations with no ability to dynamically modify or configure the X-ray sensor with additional processing modules to meet their desired application or data processing needs.

The system and apparatuses described herein include a flexible X-ray sensor formed as a digital detector array (DDA). The DDA can include a main control board configured with a control module and a plurality of configurable and exchangeable processing modules coupled to a flexible sensing array. The main control board can include image processing capabilities combined with the control module. The DDA can include a gate module and data modules that can be bonded to a flexible substrate. The arrangement of the gate module and the data modules on the flexible substrate can be connected to the control module via connectors. The connectors allow components of the DDA to be easily replaced. The control module can be coupled to a variety of additional configurable and extensible processing modules that can be arranged depending on the inspection requirements or users intended application. The control module can control the flexible sensing array and the operation of the DDA to process the acquired image data. The processing modules can include a Wi-Fi module, a battery module, an optional wired module that can be coupled to a computing device, a global positioning system (GPS) module for providing positioning data, a wireless communication module (e.g., for 5G/6G communication protocols), and an external wired interface module that can, for example, couple the DDA to an Ethernet cable. The flexible sensing array of the DDA includes photosensitive pixel arrays on a plastic substrate and includes a scintillator for detection of X-rays, and can also include a protective housing for a ruggedized solution.

The DDA can include a control system including a plurality of interchangeable data modules, a gate module, and a block control module coupled to a main board via connectors. The data modules can include at least one read-out integrated circuit (ROIC). The gate module can include at least one gate chip or gate integrated circuit (GIC). The block control module can include a block control chip or module. The block control module and the gate module can be identical. The data modules, the gate module, and the block control modules can be configured at one side of the flexible sensing array so that the DDA can be fully flexible in one direction with respect to an object to be inspected. The flexible sensing array can include a sensing area including sensing pixels and a non-sensing area including switching pixels. The non-sensing area can be configured such that each switching pixel can include one transistor and one capacitor implemented in a thin film. In this way, all the scan lines or TFTs of the sensing pixels in the sensing area can be controlled with a single gate module in the non-sensing area. Traditionally, one GIC can control a maximum of 256 scan lines. In the DDA described herein, multiple blocks of 256 scan lines can be controlled using the block control chip with a combination of the gate module.

Advantages of the DDA described herein include the flexible sensing array, which can be easily replaceable, for example if damaged during an inspection, and as a result the overall operating costs of the X-ray sensor can be reduced. The DDA described herein can also enable the control electronics and processing modules to be shielded from damaging radiation by decoupling them from the flexible sensing array and not locating them behind the sensing array as in traditional rigid X-ray sensors. Shielding can be provided in the electronic module parts locally while the imaging area can be free from shielding, such as a heavy metal shield. As a result, there is less backscattering and firster signal quality by orienting the control and processing modules away from the backside of the flexible sensing array. In this way, the lifetime operation of the DDA can be improved compared to traditional X-ray sensors. Additionally, the weight of the whole system can be reduced because heavy metal shields are not necessary for the large sensing area. Therefore it is easier to manipulate the system in the field.

Another advantage is the flexible sensing array of the DDA can allow the sensor to be used for a larger variety of applications and inspection object shapes than the planar, rigid X-ray sensors. For example, curved or bending objects can be inspected without any geometric magnification or post-processing calculations to correct for magnification due to distance to an inspected object. Thus, the flexible sensing array of the DDA described herein can provide greater data throughput and inspection flexibility with regard to inspection objects of varying geometries. The use and configurability of different interchangeable processing modules available with the DDA described herein can also increase the quality of inspections and improve inspection efficiency compared to traditional X-ray sensors which do not include such modular, add-on processing modules. As technology advances, additional modules can be easily added to the inspection system without requiring acquisition and integration of an entirely separate system. User budgets can be reduced while inspection functionality is increased by utilizing only those processing modules that are required or specific to a particular inspection methodology or requirement.

Embodiments of sensor and method of operation are discussed herein in regard to use in an oil and gas production environment. However, embodiments of the disclosure can be employed for sensing characteristics of curved or non-curved objects, as well as fluids within curved or non-curved objects, in any application or environment without limitation.

FIG. 1 is a diagram illustrating an embodiment of a flexible DDA 100 according to the subject matter provided herein. The DDA 100 can be coupled to an object 150 for an inspection of the object. As shown, the DDA 100 can include a flexible array 105 coupled to a control system 110. The control system 110 can include a main board (MB) 155 and one or more control and processing modules. For example, the control system 110 can include a control module 115, a Wi-Fi module 120, a battery module 125, an optional wired module 130, a GPS module 140, and a cellular data module, such as 5G module 145. The control system 110 can be arranged with one or more modules coupled to the control module 115 in a modular and easily configurable manner such that any one of the modules can be extensibly coupled with the control module 115 and the main board 155. The control module 115 can control operations of the flexible sensing array 105 and the data interchange between the flexible sensing array 105 and one or more modules of the control system 110. The control module 115 can control the switching operation of the flexible array 105 that will be described further herein. The Wi-Fi module 120 can receive and transmit data wirelessly with another computing device. The battery module 125 can provide power to the DDA 100. The optional wired module 130 can provide a wired interface for coupling computing devices, such as computing device 135. The GPS module 140 can provide positioning data, such as GPS coordinate system data, about the location of the object 150 being inspected. The cellular data module 145 can include a 5G cellular data module.

Figure 2:
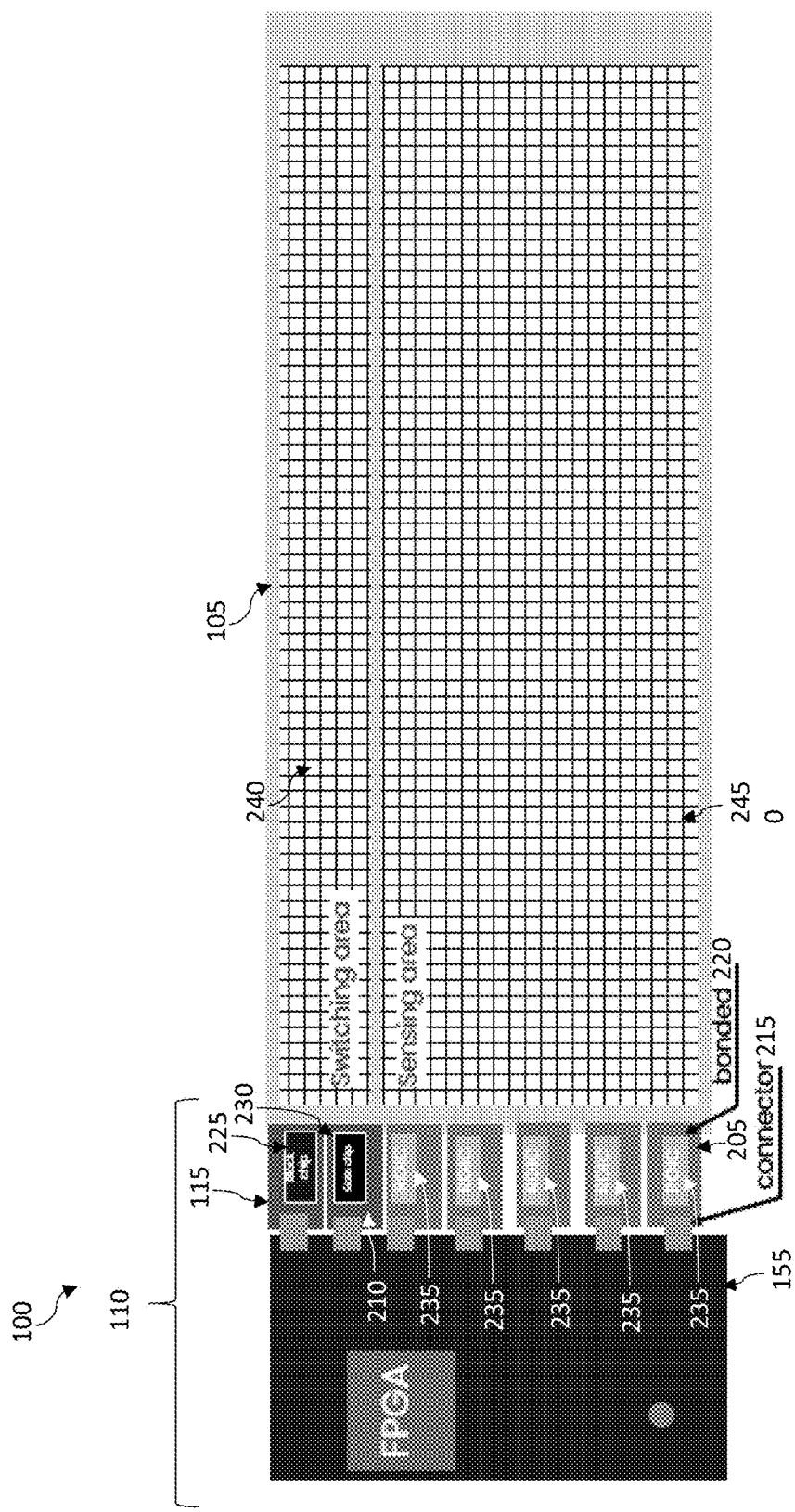
FIG. 2 is a diagram illustrating an embodiment of a control module and portions of the flexible DDA of FIG. 1 according to the subject matter provided herein.

FIG. 2 is a diagram illustrating an embodiment of DDA 100 including a control module 115 and portions of the flexible sensing array 105 of FIG. 1 according to the subject matter provided herein. The DDA 100 can include data modules 205, gate module 210, and block control module 115. The data modules 205, gate module 210, and block control module 115 can be coupled to the main board 155 via a plurality of connectors 215 at one side. The data modules 205, gate module 210, and block control module 115 can be bonded to the flexible sensing array 105 at a bonding interface 220. The block control module 115 can include a block control chip 225. The gate module 210 can include a GIC 230. Each of the data modules 205 can include a ROIC 235.

The flexible array 105 can be formed on a flexible plastic substrate and can include an external coating. The external coating can act as an external envelope for the flexible array 105 and can provide ingress protection to protect the flexible array 105 from water or dust in harsh environments. The external coating can enclose the data, gate, and block control modules. In some embodiments, the external coating can provide electrostatic discharge protection. The flexible array 105 can have a first aspect ratio and can include a pixel array of varying sizes, such as 25-250×100-600 mm. In some embodiments, the pixel array can be 110 mm×480 mm corresponding to 1450 pixels×6400 pixels. A variety of pixel array sizes, dimensions, and pixel counts or geometries can be envisioned without limit. As shown in the figure, flexible array 105 can include a switching area 240 and a sensing area 245. The switching area 240 can be coupled to a block control module 115 and a gate module 210 configured to control scanning of the sensing area 245. The sensing area 245 can be coupled to data modules that include a plurality of ROIC 235 configured to receive read-out data from the sensing area 245. A scintillator can be formed by laminating a film on to the flexible array 105. The film can be a gadolinium oxysulfide film or a cesium iodide film depending on the application.

Figure 3:
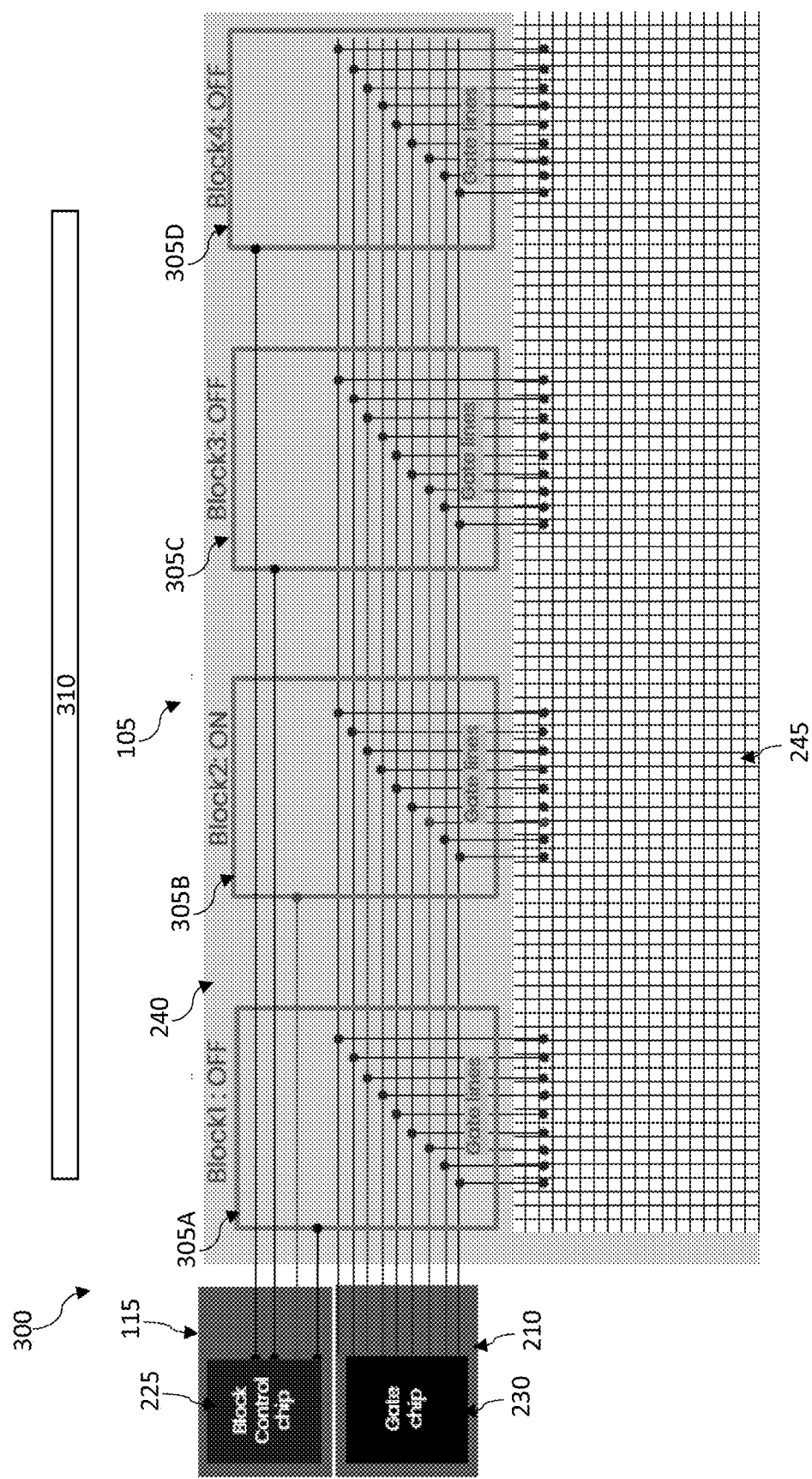
FIG. 3 is a diagram illustrating an embodiment of an architecture of the flexible DDA of FIG. 1 according to the subject matter provided herein.

FIG. 3 is a diagram illustrating an embodiment of an architecture 300 of the flexible DDA 100 of FIGS. 1 and 2 according to the subject matter provided herein. As shown in FIG. 3, the switching area 240 can be arranged in a plurality of blocks 305, such as blocks 305A-305D. The block control module 115 can control individual blocks 305 associated with portions of the sensing area 245 and the gate module 210 can control individual gate lines. The combination of the two modules can control scan lines one by one within the sensing area 245 (i.e. individual portions of sensing pixels). The flexible array 105 can include millions of sensing pixel arrays. Each pixel in the sensing area 245 can include a photodiode, a thin-film transistor (TFT), and capacitor on a flexible substrate. A scintillator 310 can be provided on top of the array 105 to convert X-ray to visible light. A pressure sensitive adhesives can be used for laminating the scintillator. The switching area 240 has switching pixel arrays, which include a TFT and a capacitor, but do not include the photodiode. In some embodiments, the switching pixel arrays can include multiple TFTs and multiple capacitors. These pixels are configured as scan line switches. There are 256 horizontal gate lines parallel to data line from the gate module 210 and each line has multiple connections to a switching pixel from each block, more specifically to the gate electrode of the TFTs. In some embodiments, there can be 32, 64, 128 or 512 gate lines depending on the capabilities and configuration of the gate module 210. There are an additional number N of block control lines from the block control module that are connected to the switching pixels, where N corresponds to the number of blocks. One block control line has multiple connections to all the switching pixels from a single block, more specifically to the source electrode of the TFTs. The block control module can turn on and off each block 305 in a desired or programmatically determined scanning order. The total number of scan lines of the flexible array 105, which are represented in vertical lines in the sensing area 245 can be determined as N*256. A scan line, at one end, has a connection to a switching pixel via the drain electrode of TFT. And at the other side it is connected to the sensing pixel via the gate electrode of TFT to turn on and off the sensing pixel TFTs. In one scan line, M sensing pixels are connected, where M is the number of data lines.

Each switching pixel in the blocks 305 can include one TFT and one capacitor. The source electrode of the TFT can be connected to a block control module 115 through a block control line and a metal line vertical to the gate line in the switching area 240. The drain electrode of the TFT can be connected to the sensing pixels via a vertical metal line in the switching area 240 and the scan line in the sensing area 245. One capacitor can be configured for each switching pixel at the drain electrode. Gate electrode of the TFT can be connected to the gate module 210. There are 256 scan lines in the sensing area 245 within a single block. The Lth scan line from each block is connected to the Lth gate line via a switching pixel. To read a charge from a sensing pixel, the scan line associated with the pixel is set to a turn-on voltage by turning ON one block control line and one gate line together. When the block control module 115 is ON, it can supply +9V (turn-on voltage) to the source electrode of a switching pixel. And the TFT of the pixel is on by gate line so the scan line is set to a turn-on voltage. In some embodiments, the block control module 215 can supply between +5V and +15V when ON. The supplied voltage can be great enough to turn ON the TFT of the sensing pixel. When the block control module 115 is off, it can supply −9 V (negative voltage). In some embodiments, the block control module 115 can supply between −5V and −15V when off. The supplied voltage can be great enough to turn off the TFT of the sensing pixel. To reset the pixels, a block control line is OFF while a gate line is ON, so the scan line associated with the switching pixel is set to a turn-off voltage. In this way, the block control module 115 and the gate module 210 can control all 256×N scan lines individually. To read charges from all the pixels, block control module 115 and the gate module 210 can repeat turning ON and off 256×N times.

Figure 4:
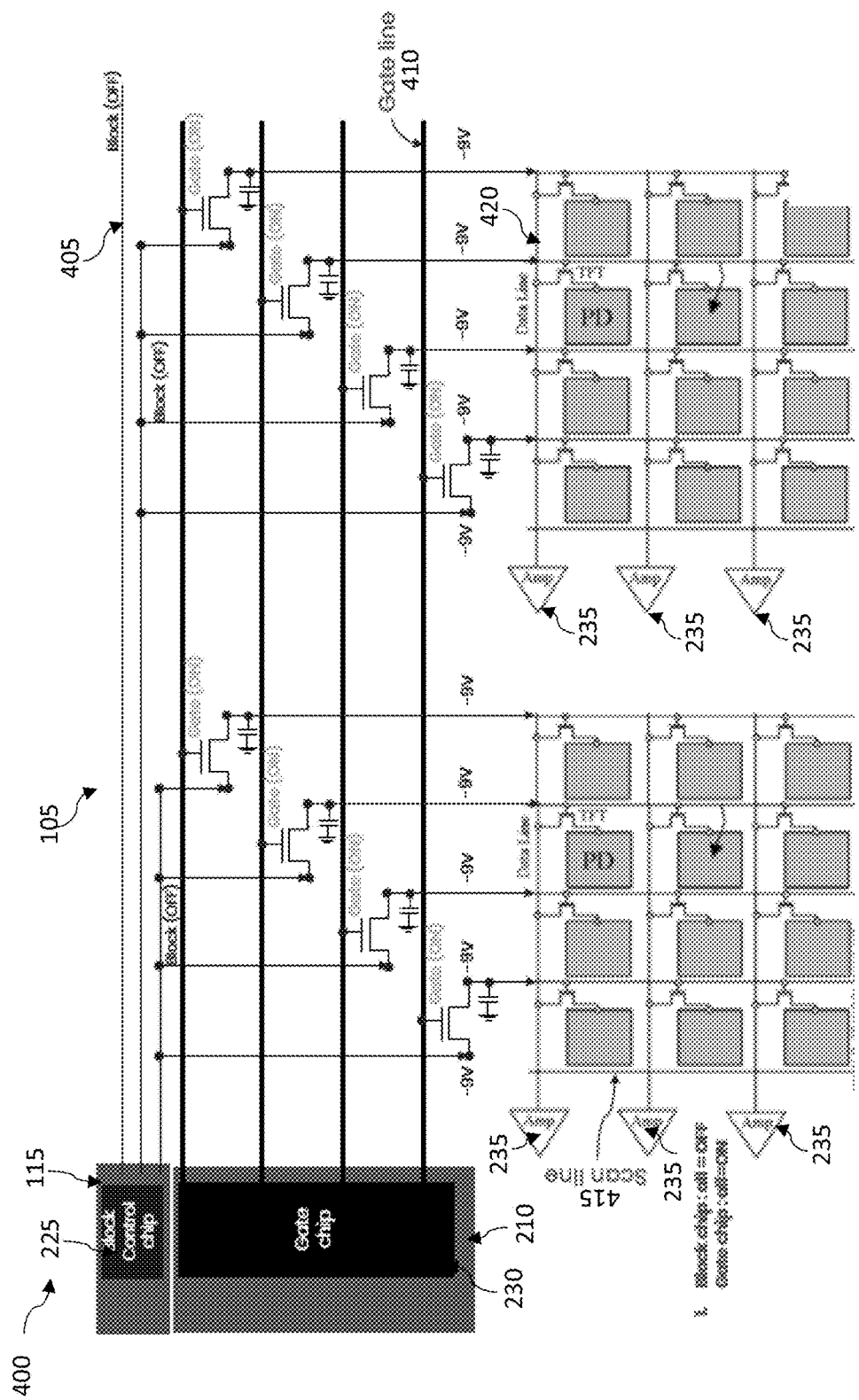
FIG. 4 is a diagram illustrating an embodiment of an initial state of the flexible DDA of FIG. 1 according to the subject matter provided herein.

FIG. 4 is a diagram illustrating an embodiment of an initial state 400 of the flexible DDA 105 of FIG. 1 according to the subject matter provided herein. As shown, in the initial state the block control module 115 can be configured so that all block control lines 405 are OFF and gate module 210 can be configured so that all gate lines 410 are ON. In this state, all the TFTs of sensing pixels will be turned OFF because all the scan lines 415 are set to turn-off voltage. This state can also be associated with an integration state in which photodiodes are integrating photo-electron charges in the pixel capacitor before collecting it to ROIC 235. Data can be received at each ROIC 235 via data lines 420.

Figure 5:
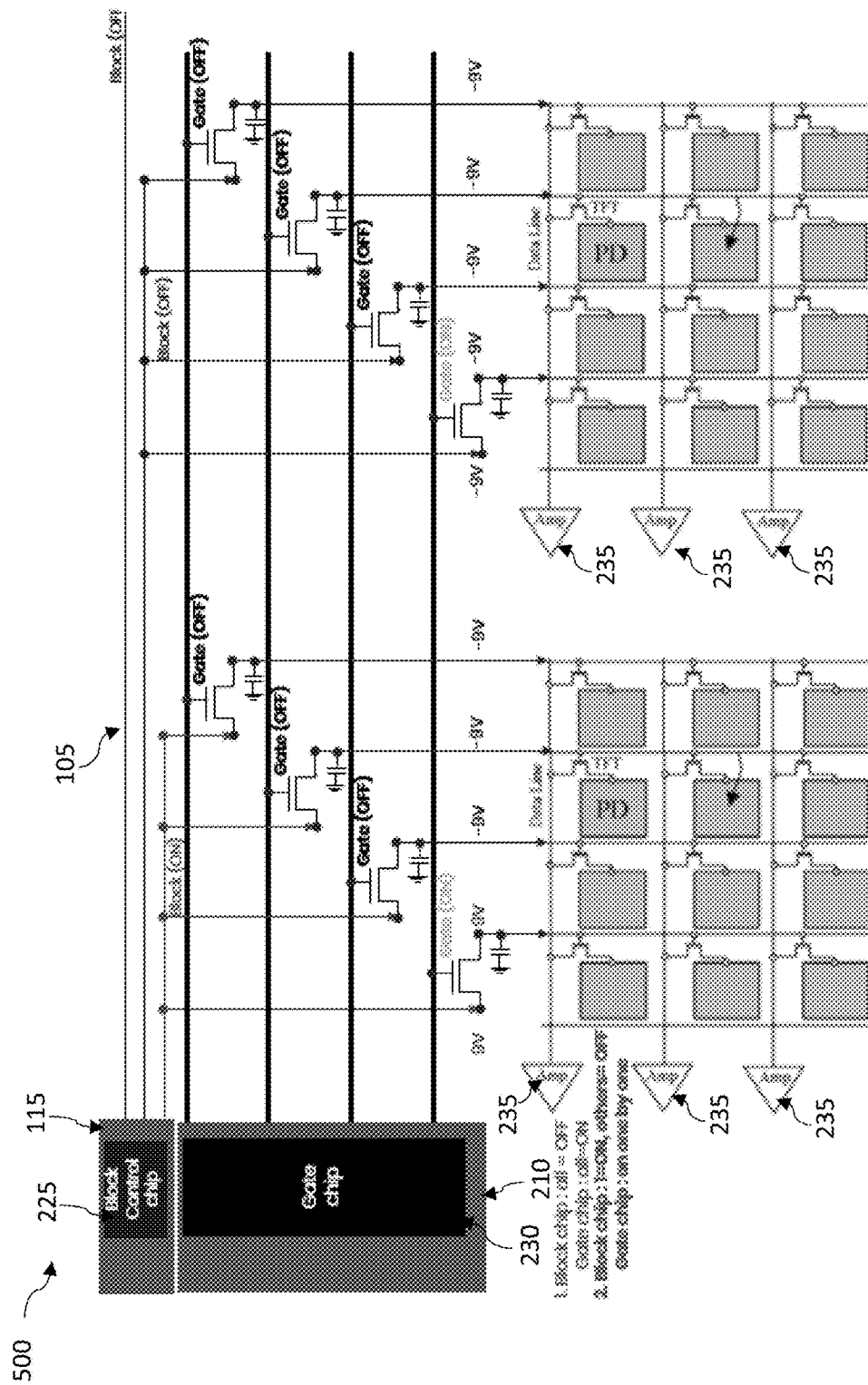
FIG. 5 is a diagram illustrating an embodiment of a read start state for the first line of the first block of the flexible DDA of FIG. 1 according to the subject matter provided herein.

FIG. 5 is a diagram illustrating an embodiment of a read start state 500 for the first scan line of the first block of the flexible DDA of FIG. 1 according to the subject matter provided herein. When initiating a read start state 500, the block control module 115 is configured so that only the first block control line is ON and the gate module 210 is configured so that only one of the four gate lines is ON. The remaining three gate lines are OFF. In this state, the first scan line is set to turn-on voltage and hence all the TFTs of the sensing pixels associated with the first scan line are turned ON. And the pixels can transmit charges to the ROIC while the other pixels are integrating photo-electron charges with a closed TFT.

Figure 6:
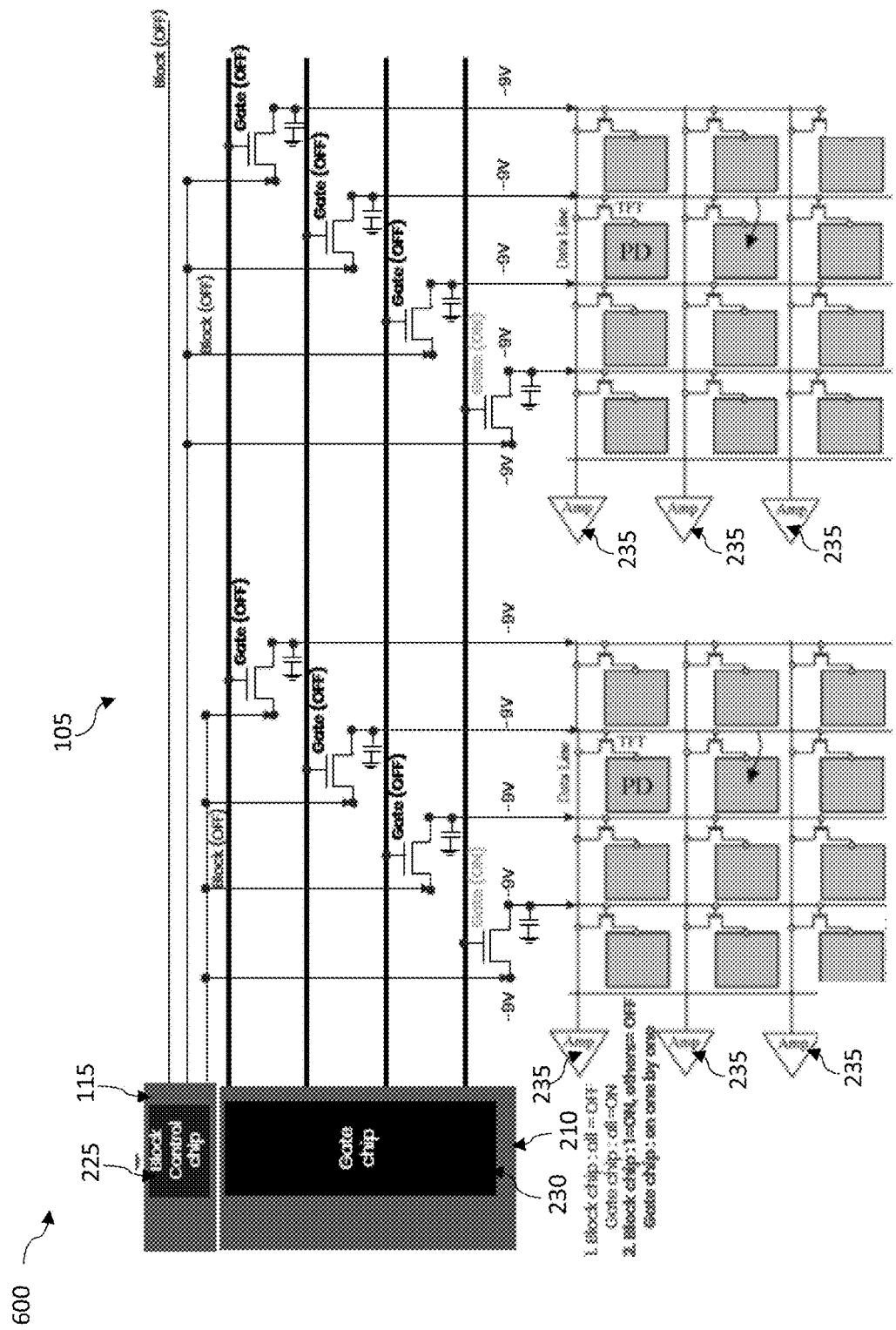
FIG. 6 is a diagram illustrating an embodiment of a read end state of the first line of the first block of the flexible DDA of FIG. 1 according to the subject matter described herein.

FIG. 6 is a diagram illustrating an embodiment of a read end state 600 of the first line of the first block of the flexible DDA of FIG. 1 according to the subject matter described herein. When the read start state 500 of FIG. 5 is complete, the DDA 100 performs the read end state 600 shown in FIG. 6. In this state, the DDA 100 is configured that the block control module 115 is OFF, while the gate module 210 is configured so that only one of the four gate lines is ON, which was turned ON in the read start state. In this state 600, the first scan line is set to turn-off voltage and the TFTs of the sensing pixels associated with the first scan line are turned OFF. All other scan lines remain in the turn-off voltage and all other TFTs of the sensing pixels is staying OFF. The pixels associated with the first scan line start a charge integration for the next frame.

Figure 7:
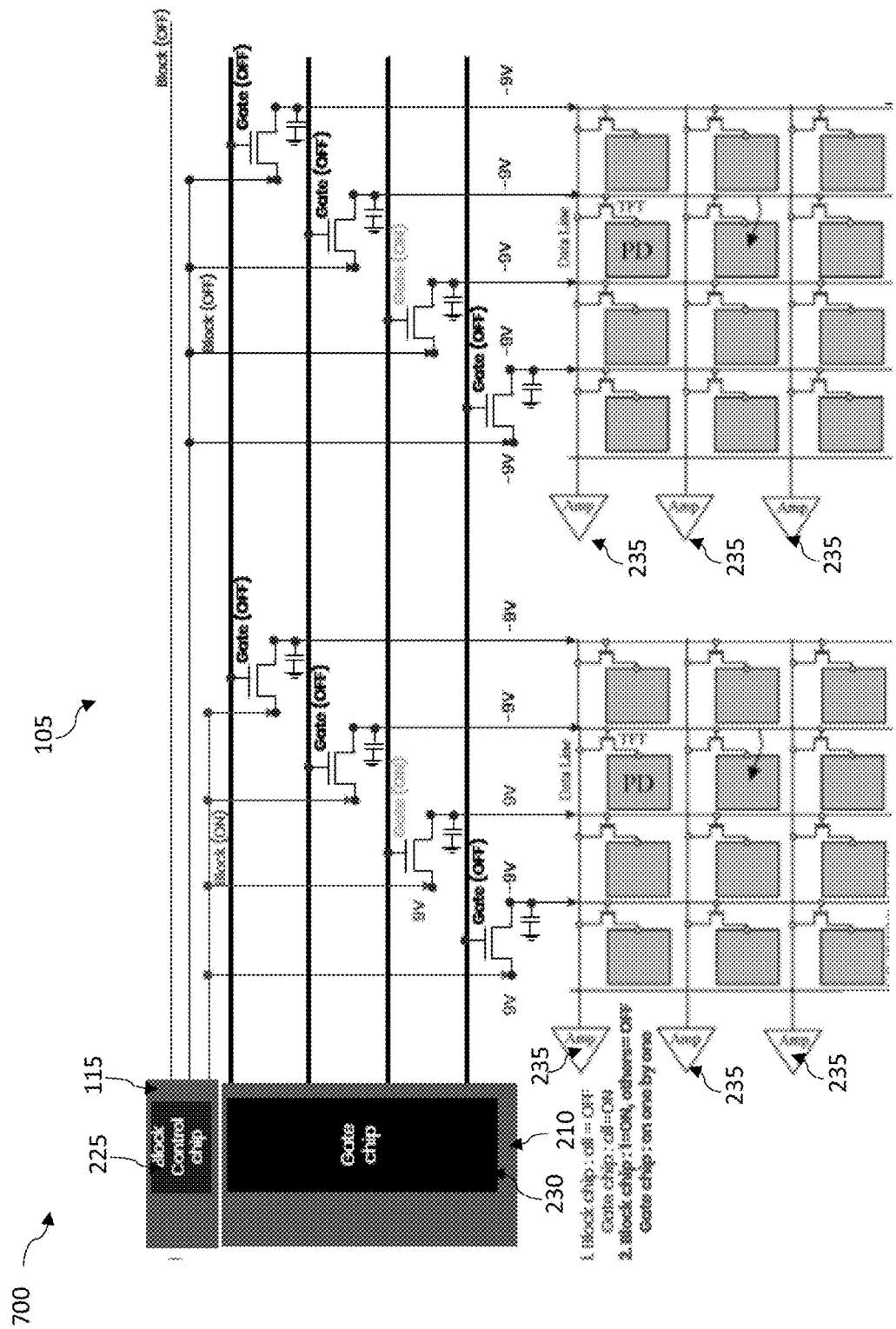
FIG. 7 is a diagram illustrating an embodiment of a transition to a read start state for the second line of the first block of the flexible DDA of FIG. 1 according to the subject matter provided herein.

FIG. 7 is a diagram illustrating an embodiment of a transition 700 to a read start state for the second line of the first block of the flexible DDA of FIG. 1 according to the subject matter provided herein. As shown in FIG. 7, the transition 700 includes configuring the block control module so that the first block control line is ON and configuring the gate module 210 so that the first gate line is OFF and the next or subsequent gate line is ON. In this state, all the TFTs of the sensing pixels associated with the second scan line is turned ON. Thus, the pixels associated with the second scan line can transmit charges to the ROIC while the other pixels are integrating photo-electron charges with a closed TFT.

The switching operations described in relation to FIGS. 4-7 for the first and the second scan lines can be iteratively performed for all the scan lines in a consecutive way by configuring block control module 115 and gate module 210. This is a demonstration how to achieve a multiplexing from all the scan lines within one block 305A. The switching operations can be also iteratively performed for all the blocks 305 in the switching area 240 with the combination of block control module 115 and gate module 210. The time it takes to transmit charges from pixels that are associated with a single scan line can be called as a line time, which includes read start and read end state. So, the total readout time will be line time times the total number of scan lines. To achieve a certain x-ray integration time, each scan line starts the readout after delaying certain time, which corresponds to the integration time minus line time. During this delay period, all the sensing pixels are integrating a photo-electron charges in the pixel capacity with a closed pixel TFT.

Figure 8:
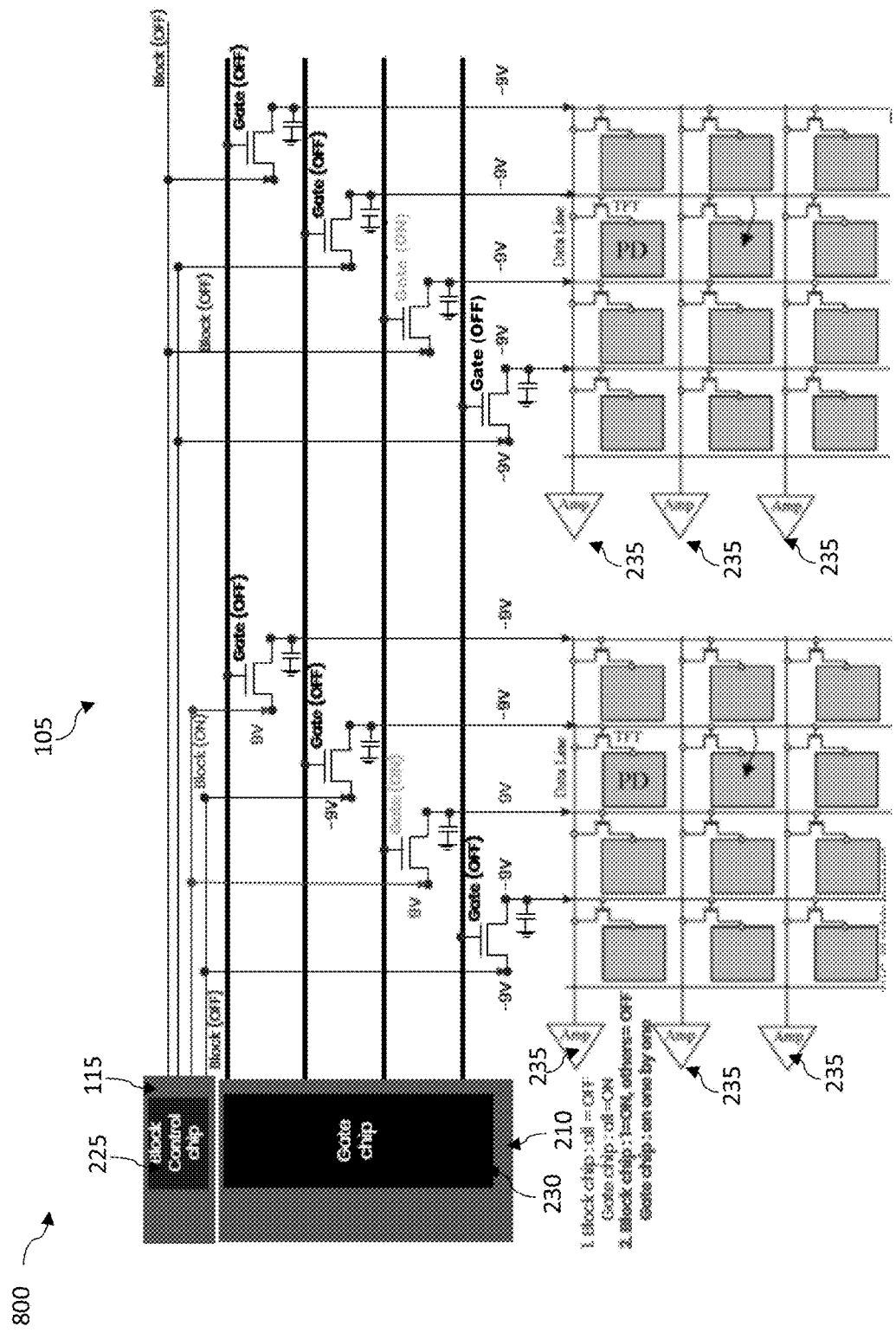
FIG. 8 is a diagram illustrating an embodiment of another architecture of the flexible DDA of FIG. 1.

FIG. 8 is a diagram illustrating an embodiment of another architecture of the flexible DDA of FIG. 1 where two block control lines are controlling one block 800 according to the subject matter provided herein. FIG. 8 corresponds to a transition to a read start state for the second line of the first block similar to FIG. 7. In this configuration, there are twice more block control lines. The first block control line can be connected to only the odd numbered switching pixels of the first block and the second block control line can be connected to only the even numbered switching pixels of the first block. Similarly, the third and the fourth block control lines can be used for switching pixels of the second block. In this way, during the state change from the read end to the read start of the next scan line, the TFT of the previously closed switching pixel has a voltage change only from the gate electrode. In the previous example 700, the TFT had voltage transitions on both gate and source electrode simultaneously that makes the TFT state unclear. In some embodiment, three or more block control lines can be used for controlling one block. In this way, the switching pixels can be controlled in a more accurate and stable way.

Figure 9:
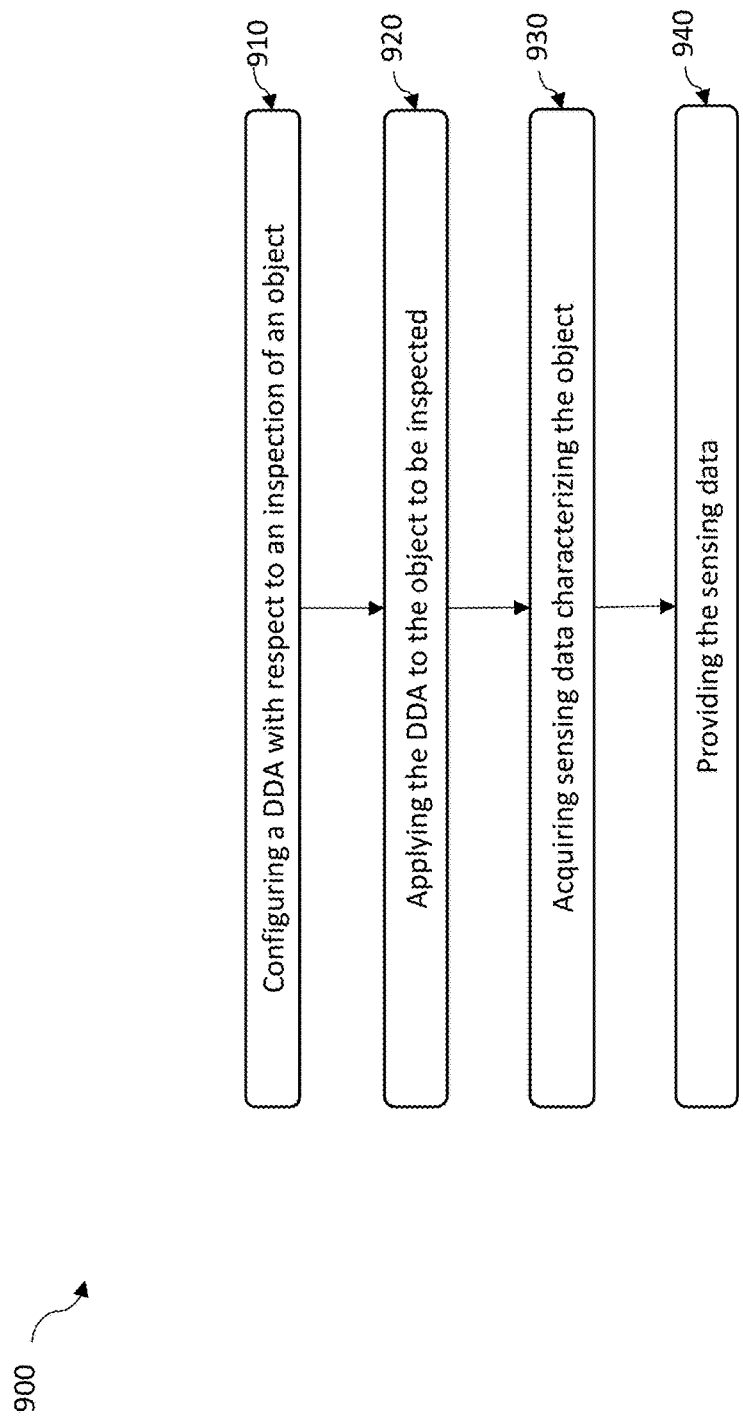
FIG. 9 is a flow chart illustrating an embodiment of a method for performing an inspection using the flexible DDA of FIG. 1 according to the subject matter provided herein.

FIG. 9 is a flow chart illustrating an embodiment of a method 800 for performing an inspection using the flexible DDA of FIG. 1 according to the subject matter provided herein. At 910, the flexible DDA 100 described herein can be configured for an inspection of an object. Configuring the DDA 100 can include selecting one or more modules of the control system 110 and coupling the selected modules to the control module 115. In some embodiments, the object can be a piece of industrial equipment or a portion of pipe included in a pipeline. The object can be any object for which an X-ray inspection is to be performed thereon. In some embodiments, configuring the DDA can include initiating an inspection procedure, calibrating aspects of the DDA 100, or coupling and configuring one or more computing devices 135.

At 920, the DDA 100 can be applied to the object to be inspected. For example, the DDA 100 can be applied or positioned relative to a curved exterior wall of a pipe to be inspected. In some embodiments, applying the DDA 100 to the object to be inspected can include receiving GPS data to identify a location of the object at which the inspection should occur. Applying the DDA 100 to the object can also include mating the flexible array 105 to the object such that a contacting interface is formed between the object surface and the flexible array 105.

At 930, the DDA 100 can acquire sensing data characterizing the object 150. For example, the DDA 100 can be operated according to the switching operations described in relation to FIGS. 3-8 to collect data associated with the object 150. In some embodiments, the sensing data can include X-ray image data in a pixel-wise format or a time-series format.

At 940, the DDA 100 can provide the sensing data. For example, the DDA 100 can provide the sensing data via a GUI of the computing device 135. In some embodiments, the DDA 100 can store the sensing data in a memory configured in the control module 115 or in the computing device 135. In some embodiments, the DDA 100 can provide the sensing data to a computing device or data storage device (e.g., a memory, or a server) coupled via the optional wired module 130. In some embodiments, providing the sensing data can be achieved by transmitting data via the Wi-Fi module 120 or the cellular data module 145.

The improved method of manufacturing described herein address the technical problem of performing an X-ray inspection on an object with a curved surface in a physical environment of limited space. The unique design of the DDA provided herein can enable inspection of non-planar object surfaces in reduced volume environments. The DDA described herein can also enable dynamic reconfiguration before or during inspections so that user or inspection requirements can be rapidly and efficiently addressed. The DDA herein requires less processing for geometric adjustments or calculations related to correcting magnification compared to planar sensors. The arrangement of the control system on a single side of the DDA instead of around the periphery or backside of the DDA can also reduce the problem of radiation backscattering, signal loss, and degraded component performance due to radiation exposure.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. An apparatus comprising:
   a control system including a block control module including block control circuitry, a gate control module including gate control circuitry, and at least one data module including data circuitry, wherein the block control module and the gate control module are configured to execute a multiplexing operation; and
   a flexible substrate coupled to the control system at an edge of the flexible substrate via a plurality of connectors, the flexible substrate including
   a switching area including a plurality of switching pixels arranged within a plurality of blocks, each switching pixel communicatively coupled to the block control module via the block control circuitry and to the gate control module via the gate control circuitry; and
   a sensing area including an array of sensing pixels, the array of sensing pixels configured to generate image data responsive to X-rays incident thereon and provide the image data to the at least one data module via the data circuitry, wherein each switching pixel of the plurality of switching pixels controls a read state of a portion of the array of sensing pixels.

2. The apparatus of claim 1, wherein the block control module is configured to provide a first block control signal to a first block including a first plurality of switching pixels to power on the first block and a second block control signal to blocks other than the first block to power off the blocks other than the first block.

3. The apparatus of claim 2, wherein, the gate control module is configured to provide a first gate control signal to a second plurality of switching pixels, and a second gate control signal to all switching pixels outside of the second plurality of switching pixels, wherein each switching pixel in the second plurality of switching pixels is in a different block of the switching area and the first gate control signal causes a first switching pixel in the second plurality of switching pixels in the first block to activate, causing a first portion of sensing pixels of the sensing area to transition from a non-read state to a read state.

4. The apparatus of claim 3, wherein image data generated by the first portion of sensing pixels associated with the first switching pixel is provided to the at least one data module via the data circuitry responsive to transitioning to the read state.

5. The apparatus of claim 3, wherein the first block control signal and the first gate control signal include a first predetermined voltage, and the second block control signal and the second gate control signal include a second predetermined voltage.

6. The apparatus of claim 1, wherein the flexible substrate includes a coating enclosing the data module, the gate module, and the block control module.

7. The apparatus of claim 1, wherein
each sensing pixel of the array of sensing pixels includes at least one photodiode, and at least one sensing thin-film transistor (TFT);
each switching pixel of the plurality of switching pixels includes at least one gate TFT and at least one gate capacitor;
the block control module includes a first gate integrated circuit (GIC);
the gate control module includes a second gate integrated circuit (GIC); and
the at least one data module includes at least one read-out integrated circuit (ROIC).

8. The apparatus of claim 7, wherein each sensing pixel of the array of sensing pixels further includes at least one sensing pixel capacitor, and the apparatus further comprises:
a film laminated to the flexible substrate forming a scintillator.

9. The apparatus of claim 8, wherein the film includes a gadolinium oxysulfide film or a cesium iodide film.

10. The apparatus of claim 1, wherein the block control module and the gate control module each include 32, 64, 128, 256, 512 or 1024 ports connecting the block control module and the gate control module to the plurality of blocks or the plurality of switching pixels, respectively.

11. The apparatus of claim 1, wherein the sensing pixels of the sensing area have a first dimension between 25 mm-250 mm associated with width and a second dimension between 100 mm-600 mm associated with length.

12. A method comprising:
configuring a flexible x-ray digital detector array (DDA) with respect to an object to be inspected, the flexible DDA including a bus, a control system including a block control module including block control circuitry, a gate control module including gate control circuitry, and at least one data modules including data circuitry, wherein the block control module and the gate control module are configured to execute a multiplexing operation, and a flexible substrate coupled to the control system at one edge of the flexible substrate via a plurality of connectors, the flexible substrate including a switching area including a plurality of switching pixels arranged within a plurality of blocks, each switching pixel communicatively coupled to the block control module via the block control circuitry and to the gate control module via the gate control circuitry, and a sensing area including an array of sensing pixels, the array of sensing pixels configured to generate image data responsive to X-rays incident thereon and provide the image data to the at least one data module via the data circuitry, wherein each switching pixel of the plurality of switching pixels controls a read state of a portion of sensing pixels;
scanning the object using an X-ray emitting device;
acquiring, by a computing system including at least one processor communicatively coupled to the flexible DDA, image data characterizing the scanned object.

13. The method of claim 12, wherein the acquiring further comprises:
providing a first block control signal to a first block including a first plurality of switching pixels to power on the first block, and providing a second block control signal to the blocks other than the first block via the block circuitry;
providing a first gate control signal to a second plurality of switching pixels and providing a second gate control signal to all switching pixels outside of the second plurality of switching pixels, wherein each switching pixel in the second plurality is in a different block and the first gate control signal causes a first switching pixel in the second plurality of switching pixels and in the first block to activate, causing a first portion of sensing pixels of the sensing area to transition from a non-read state to a read state;
receiving, by the at least one processor, image data characterizing the scanned object from the first portion of sensing pixels from the at least one data module via a communication module coupled to the bus;
providing a second block control signal to the first block via the block circuitry causing the first switching pixel to deactivate causing the first portion of sensing pixels of the sensing area to transition from the read state to the non-read state.

14. The method of claim 13, wherein the acquiring further comprises:
providing the second gate control signal to the second plurality of switching pixels;
providing the first block control signal to the first block and providing the second block control signal to the blocks other than the first block via the block circuitry;
providing the first gate control signal to a third plurality of switching pixels and providing the second gate control signal to all switching pixels outside of the third plurality of switching pixels, wherein each switching pixel in the third plurality is in a different block and the first gate control signal causes a second switching pixel in the third plurality of switching pixels and in the first block to activate, causing a second portion of sensing pixels of the sensing area to transition from a non-read state to a read state;
receiving, by the at least one processor, image data characterizing the scanned object from the second portion of sensing pixels from the at least one data module via a communication module coupled to the bus;
providing the second block control signal to the first block via the block circuitry causing the second switching pixel to deactivate causing the second portion of sensing pixels of the sensing area to transition from the read state to the non-read state;
repeating the steps of acquiring for all of the switching pixels in the first block; and
repeating the steps of acquiring for all of the blocks in the plurality of blocks.

15. The method of claim 13, wherein the acquiring further comprises:
providing the second gate control signal to the second plurality of switching pixels;
providing the first block control signal to a second block including a fourth plurality of switching pixels, and providing the second block control signal to the blocks other than the second block via the block circuitry;
providing the first gate control signal to the third plurality of switching pixels and providing the second gate control signal to all switching pixels outside of the third plurality of switching pixels, wherein each switching pixel in the third plurality is in a different block and the first gate control signal causes the second switching pixel in the third plurality of switching pixels and in the second block to activate, causing a second portion of sensing pixels of the sensing area to transition from a non-read state to a read state;
receiving, by the at least one processor, image data characterizing the scanned object from the second portion of sensing pixels from the at least one data module via a communication module coupled to the bus;

providing the second block control signal to the second block via the block circuitry causing the second switching pixel to deactivate causing the second portion of sensing pixels of the sensing area to transition from the read state to the non-read state; and repeating the steps of acquiring starting by providing the first block control signal to the first block and the first gate control signal to a fifth plurality of switching pixels or by providing the first block control signal to a third block and the first gate control signal to the fifth plurality of switching pixels.

16. The method of claim 12, wherein the first block control signal and the first gate control signal include a first predetermined voltage, and the second block control signal and the second gate control signal include a second predetermined voltage.

17. A system comprising: a bus; a control system including a block control module including block control circuitry, a gate control module including gate control circuitry, and at least one data module including data circuitry; a flexible substrate coupled to the control system at one edge of the flexible substrate via a plurality of connectors, the flexible substrate including a switching area including a plurality of switching pixels arranged within respective blocks, each switching pixel communicatively coupled to the block control module via the block control circuitry and to the gate control module via the gate control circuitry, wherein the block control module and the gate control module are configured to execute a multiplexing operation; and a sensing area including an array of sensing pixels, the array of sensing pixels configured to generate image data responsive to X-rays incident thereon and provide the image data to the at least one data module via the data circuitry, wherein each switching pixel of the plurality of switching pixels controls a read state of a portion of sensing pixels; a plurality of connectors provided on the edge of the flexible substrate configured to communicatively connect the block control module, gate control module, and at least one data module to the bus; a communication module coupled to the bus and configured carry out communication protocols within the system; a battery module coupled to the bus and configured to provide power to the system; and a computing system, including at least one data processor configured acquire the image data.

18. The system of claim 17, wherein the flexible substrate is configured to be detachably coupled to the bus at the plurality of connectors for replacement.

19. The system of claim 17, wherein the communication module is any one of a 5G or 6G communication module, a Wi-Fi module, and a wired Ethernet module.

20. The system of claim 17, further comprising:
a global positioning system (GPS) module configured to provide positioning data corresponding to a location of the system to an external system.

* * * * *